(12) United States Patent
Shimura et al.

(10) Patent No.: US 8,029,030 B2
(45) Date of Patent: Oct. 4, 2011

(54) LOCK DEVICE FOR USE IN MOTOR VEHICLE

(75) Inventors: Ryoji Shimura, Yokohama (JP); Katsumi Nakagome, Yokohama (JP)

(73) Assignee: Mitsui Kinzoku Act Corporation, Yokohama-shi (JP)

( * ) Notice: Subject to any disclaimer, the term of this patent is extended or adjusted under 35 U.S.C. 154(b) by 1218 days.

(21) Appl. No.: 11/729,858

(22) Filed: Mar. 30, 2007

(65) Prior Publication Data

US 2008/0054151 A1 Mar. 6, 2008

(30) Foreign Application Priority Data

Aug. 31, 2006 (JP) ................................. 2006-236299

(51) Int. Cl.
*E05C 3/06* (2006.01)
(52) U.S. Cl. ............. 292/216; 296/65.03; 292/DIG. 23; 292/DIG. 43
(58) Field of Classification Search ............... 248/503.1; 297/376, 378.12, 378.13, 378.14; 296/65.03; 292/65.01, 65.03, 65.05, 65.06, 65.09, 201, 292/216, 56, 11, 111, 113, 215, DIG. 14, 292/DIG. 43, DIG. 23
See application file for complete search history.

(56) References Cited

U.S. PATENT DOCUMENTS

| | | | | |
|---|---|---|---|---|
| 3,905,624 | A * | 9/1975 | Fujita .............................. | 292/11 |
| 4,896,907 | A * | 1/1990 | Hayakawa et al. ............ | 292/216 |
| 5,730,480 | A * | 3/1998 | Takamura .................. | 248/503.1 |
| 5,746,457 | A * | 5/1998 | Kim ................................ | 292/216 |
| 6,012,747 | A * | 1/2000 | Takamura et al. ............. | 292/216 |
| 6,422,616 | B1 * | 7/2002 | Wortmann et al. ............ | 292/216 |
| 6,945,585 | B1 * | 9/2005 | Liu et al. ..................... | 296/65.03 |
| 7,431,371 | B2 * | 10/2008 | Miller et al. ................ | 296/65.03 |
| 7,575,280 | B2 * | 8/2009 | Palomba et al. .............. | 297/336 |
| 2005/0269854 | A1* | 12/2005 | Lutzka et al. ............. | 297/378.13 |

FOREIGN PATENT DOCUMENTS

| | | |
|---|---|---|
| DE | 31 24 786 A1 | 6/1982 |
| DE | 196 05 488 A1 | 9/1996 |
| EP | 1516985 A1 | 3/2005 |
| JP | 8-218711 A | 8/1996 |

* cited by examiner

*Primary Examiner* — Kristina Fulton
(74) *Attorney, Agent, or Firm* — Foley & Lardner LLP

(57) ABSTRACT

A pair of restraining plates are pivotally installed in a housing of a lock unit. The restraining plates have respective cam portions that are arranged to put therebetween a striker when the restraining plates are pivoted in respective given directions. A biasing member is arranged to bias one of the restraining plates to pivot in the given direction thereof, and a transmission mechanism is arranged between the restraining plates to induce a synchronized pivoting of the two restraining plates. Thus, when one of the restraining plates is pivoted in the given direction thereof, the other of the restraining plates is pivoted in the given direction thereof. With this arrangement, once the striker is locked by the lock unit, at least one of the cam portions of the restraining plates is pressed against the striker thereby to suppress or at least minimize undesirable play of the lock unit relative to the striker.

9 Claims, 5 Drawing Sheets

LOCK DEVICE FOR USE IN MOTOR VEHICLE

BACKGROUND OF THE INVENTION

1. Field of the Invention

The present invention relates in general to lock devices for use in motor vehicles and more particularly to lock devices for locking a vehicle seat, vehicle door, engine hood, trunk lid, seat back and the like. More specifically, the present invention is concerned with a lock device that locks a retractable vehicle seat to a vehicle floor when the seat is pivoted back to its normal in-use position.

2. Description of the Related Art

In the field of motor vehicles, particularly one-box type passenger motor vehicles, there is a retractable type seat that is permitted to pivot up from its normal in-use position to an upper not in-use position for providing the vehicle floor with a larger free space. In such a seat, a lock device is usually provided for locking the seat when the same is returned back from the retracted position to its normal in-use position for the safety of passengers.

One of the lock devices of such type is shown in Japanese Laid-open Patent Application (Tokkaihei) 8-218711.

The lock device of this publication generally comprises a striker that is fixed to the vehicle floor and has a horizontally extending part, and a lock unit that is fixed to a leg portion of the retractable seat. The lock unit comprises a housing, a latch member installed in the housing and engageable with the horizontally extending part of the striker, a pawl member installed in the housing and capable of locking an engaged condition between the latch member and the striker, a restraining member contactable with the striker and a control lever capable of releasing the locked engaged condition between the latch member and the striker when turned in a given direction. When the retractable seat is in its normal in-use position, the latch member is fully engaged with the horizontally extending part of the striker and locked by the pawl member. Under this seat lock condition, a cam part of the restraining member is tightly pressed against the striker to assure a play-free standing of the seat in the in-use position. When now the control lever is turned in the given or release direction, the pawl member unlocks the engaged condition between the latch member and the striker and at the same time the cam part of the restraining member is released away from the striker. Upon this, the lock unit is released from the striker, and thus, the retractable seat is permitted to pivot upward from the normal in-use position toward the upper not in-use position when applied with a certain external force. The housing is provided with a striker receiving slot for receiving the horizontally extending striker.

SUMMARY OF THE INVENTION

However, due to its inherent construction, the lock device of the above-mentioned publication fails to exhibit a satisfied play free standing of the seat in the in-use position. Actually, in the disclosed measures, for effectively reducing the undesired play of the seat, it is necessary to enlarge the size of the cam part of the restraining member. However, in this case, the stroke of the control lever needed for releasing the cam part of the restraining member from the striker is inevitably increased which however brings about a troublesome work with which an operator has to handle the control lever. This drawback becomes remarked when the size of the striker receiving slot is increased for the purpose of assuring insert of the striker into the slot.

Accordingly, it is an object of the present invention to provide a lock device for use in a motor vehicle, which is free of the above-mentioned drawbacks.

According to the present invention, there is provided a seat lock device which is readily assembled, assures a play-free posture of a retractable seat that is locked in the normal in-use position and assures an easier work with which an operator can handle the seat lock device.

In accordance with a first aspect of the present invention, there is provided a lock device which comprises a striker; and a lock unit including a housing having a striker receiving slot, a latch plate pivotally installed in the housing to latch the striker when the striker comes into the striker receiving slot, a pawl plate pivotally installed in the housing to lock the latch plate when pivoting in a given direction; biasing means for biasing the latch plate in a direction to release the striker and biasing the pawl member in a direction to induce the locking of the latch plate; a pair of restraining plates pivotally installed in the housing, the restraining plates having respective cam portions that are arranged to put therebetween the striker when the restraining plates are pivoted in given directions; a biasing member for biasing one of the restraining plates to pivot in the given direction thereof; and a transmission mechanism arranged between the restraining plates to induce a synchronized pivoting of the two restraining plates, so that when one of the restraining plates is pivoted in the given direction thereof, the other of the restraining plates is pivoted in the given direction thereof.

In accordance with a second aspect of the present invention, there is provided a lock device for locking a retractable seat to a floor when the seat is pivoted down from its not in-use position to its in-use position, which comprises a striker secured to the floor, the striker including a horizontally extending part that extends along the floor keeping a certain clearance therebetween; a lock unit secured to the retractable seat to move therewith, the lock unit including a housing having a striker receiving slot, a latch plate pivotally installed in the housing to latch the striker when, upon pivoting of the seat to the in-use position, the striker comes into the striker receiving slot, a pawl plate pivotally installed in the housing to lock the latch plate when pivoting in a given direction; biasing means for biasing the latch plate in a direction to release the striker and biasing the pawl member in a direction to induce the locking of the latch plate; a pair of restraining plates pivotally installed in the housing, the restraining plates having respective cam portions that are arranged to put therebetween the striker when the restraining plates are pivoted in given directions; a biasing member for biasing one of the restraining plates to pivot in the given direction thereof; and a transmission mechanism arranged between the restraining plates to induce a synchronized pivoting of the two restraining plates, so that when one of the restraining plates is pivoted in the given direction thereof, the other of the restraining plates is pivoted in the given direction thereof, wherein the striker receiving slot of the housing is so sized as to induce a condition wherein when, upon pivoting of the seat to the in-use position, the striker is latched by the latch plate and the restraining plates are pivoted in the given directions with the aid of the force of the biasing member, only one of the cam portions of the restraining plates is pressed against the striker.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
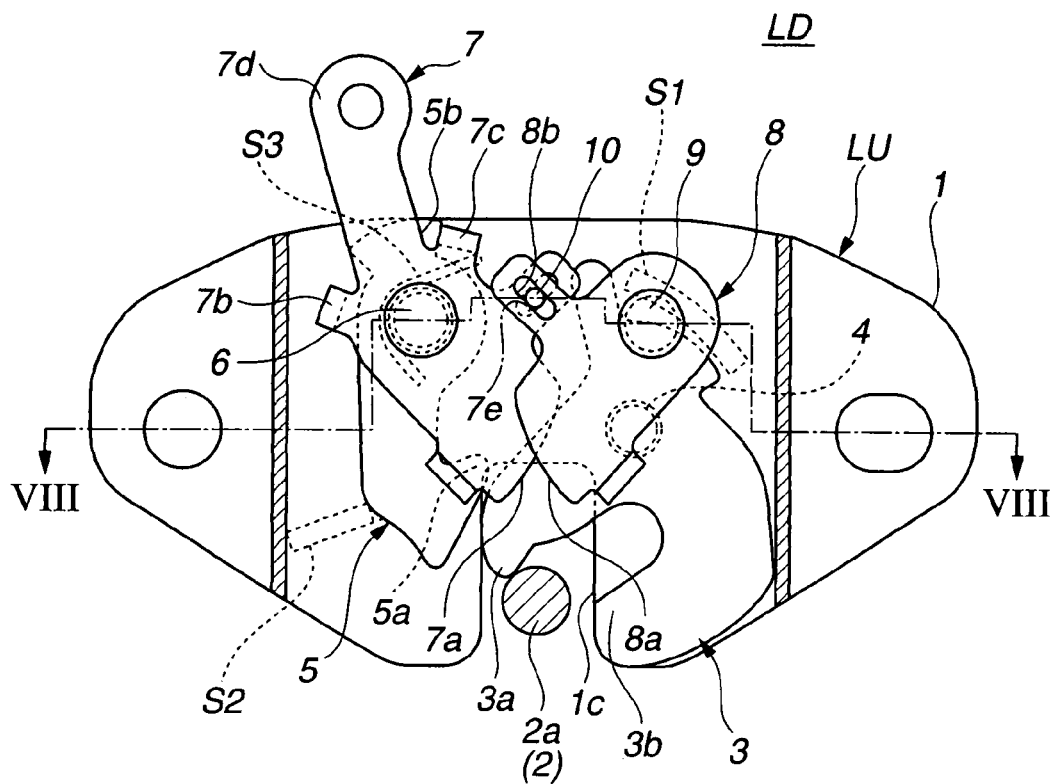
FIG. 1 is a plan view of a lock device according to the present invention with a cover plate removed, showing a condition wherein a lock unit is about to catch a striker.

In the following, a lock device of the present invention will be described in detail with reference to the accompanying drawings.

For ease of understanding, various directional terms, such as, right, left, upper, lower, rightward and the like are used in the following description. However, such terms are to be understood with respect to only the drawing or drawings on which a corresponding part or portion is shown.

Figure 9:
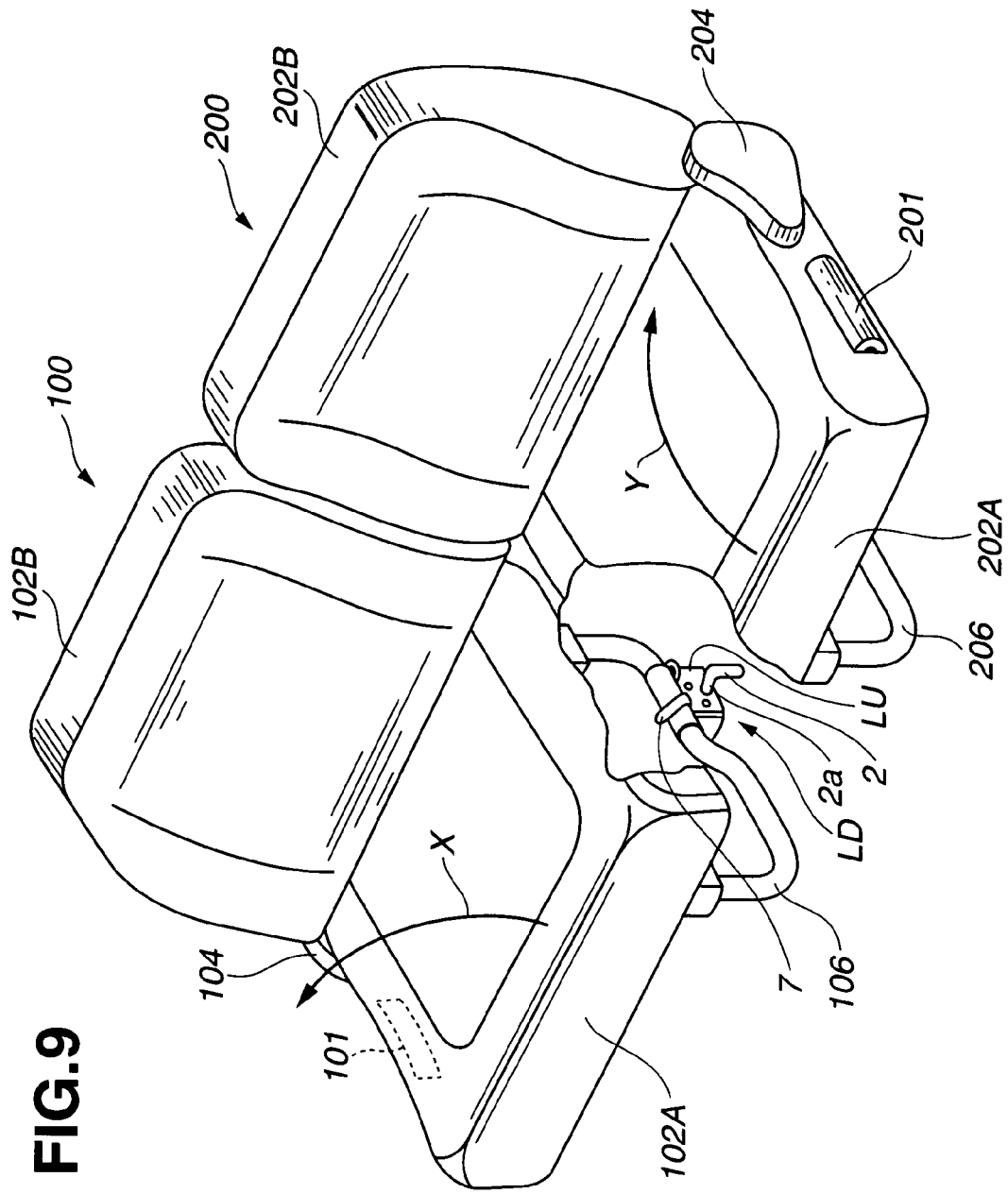
FIG. 9 is a partially cut perspective view of two retractable seats to which lock devices of the present invention are practically applied respectively.

For the easy understanding of the lock device of the invention, firstly, the description will be directed to a case wherein the lock device is applied to a retractable seat of a motor vehicle which is shown in FIG. 9.

Referring to the drawing (viz., FIG. 9), there are shown two retractable seats 100 and 200 to which respective lock devices of the invention are practically applied.

It is to be noted that the seats 100 and 200 shown in the drawing are in their normal in-use position and each seat 100 or 200 is locked by the lock device of the invention. It is further to be noted that when the lock devices unlock the seats 100 and 200, each seat 100 or 200 is permitted to pivot upward from the normal in-use position to an upper not in-use position as is indicated by an arrow "X" or "Y" when a certain external force is applied to the seat 100 or 200. For such pivot movement of the seat 100 or 200, a hinge mechanism 101 or 201 is provided at an outer side of the seat 100 or 200. Actually, before such upward pivoting of the seat 100 or 200, a back rest 102B or 202B is pivoted backward to a position where the back rest 102B or 202B is flush with a seat portion 102A or 202A of the seat 100 or 200. For this pivoting, a reclining mechanism 104 or 204 is arranged between the seat portion 102A or 202A and the back rest 102B or 202B. Indicated by numerals 106 and 206 are U-shaped pipes that are pivotally connected to lower walls of the seat portions 102A and 202A to serve as stands or legs of the seat 100 and 200 when the seats 100 and 200 are in their normal in-use position.

In the drawing, the lock device for the retractable seat 100 is denoted by reference "LD". The lock device for the other retractable seat 200 has substantially the same construction as the lock device "LD", and thus, in the following, the description will be directed to only the lock device "LD" of the seat 100 for ease of description.

As is seen from FIG. 9, the lock device "LD" comprises generally a striker 2 that is fixed to a vehicle floor and a lock unit "LU" that is fixed to the U-shaped leg pipe 106 of the seat 100. As shown, the striker 2 is formed with a horizontally extending part 2a that is actually engageable with the lock unit "LU" as will become apparent as the description proceeds. That is, when the seat 100 (or 200) is in its normal in-use position as shown in FIG. 9, the horizontally extending part 2a of the striker 2 is engaged with and locked by the lock unit "LU".

In the following, the lock device "LD" of the invention will be described in detail with reference to FIGS. 1 to 8 of the drawings.

Referring to FIG. 1, there is shown a plan view of the lock device "LD" of the invention with a cover plate removed.

As is mentioned hereinabove and seen from FIG. 9, the lock device "LD" generally comprises a striker 2 that is fixed to the vehicle floor and a lock unit "LU" that is connected to the U-shaped leg pipe 106 of the seat 100.

The striker 2 has a straight part 2a that extends horizontally along the vehicle floor keeping a certain clearance therebetween. The part 2a will be called "horizontally extending part" in the following. It is to be noted that the lock device "LD" shown in FIG. 1 is in a condition wherein the lock unit "LU" is about to catch the striker 2 (more specifically, the horizontally extending part 2a of the striker 2).

Figure 8:
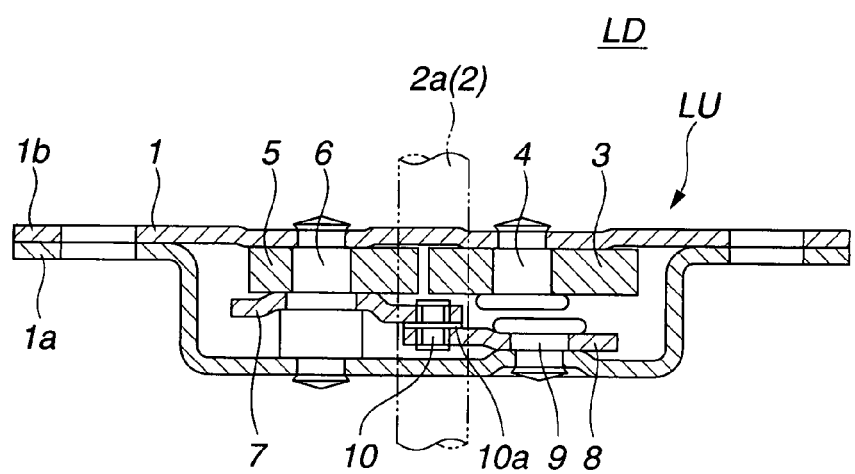
FIG. 8 is a sectional view taken along the line VIII-VIII of FIG. 1.

As is seen from FIGS. 1 and 8, the lock unit "LU" comprises a housing 1, a latch plate 3 pivotally installed in the housing 1, a pawl plate 5 pivotally installed in the housing 1 and engageable with the latch plate 3 to lock the same and a pair of restraining plates 7 and 8 pivotally installed in the housing 1 and linked to each other.

As is best seen from FIG. 8, the housing 1 comprises a recessed base plate 1a and a cover plate 1b that are coupled to define therebetween a space for receiving therein the above-mentioned parts 3, 5, 7 and 8. The base plate 1a and cover plate 1b are formed with identical slots that constitute a striker receiving slot 1c of the housing 1.

The pair of restraining plates 7 and 8 are arranged in a manner to place therebetween the striker receiving slot 1c. That is, in FIG. 1, the restraining plate 7 is arranged at a left side of the slot 1c and the other restraining plate 8 is arranged at a right side of the slot 1c.

As is seen from FIGS. 1 and 8, the latch plate 3 is pivotally connected to the cover plate 1b of the housing 1 through a pivot shaft 4. As is seen from FIG. 1, a biasing spring S1 is set in the housing 1 to bias the latch plate 3 in a counterclockwise direction in FIG. 1.

The pawl plate 5 is pivotally connected to the cover plate 1b of the housing 1 through a pivot shaft 6. As is seen from FIG. 1, another biasing spring S2 is set in the housing 1 to bias the pawl plate 5 in a counterclockwise direction in FIG. 1, that is, in a direction to abut against the latch plate 3 at a lower portion of the pawl plate 5.

As is seen from FIG. 1, the pawl plate 5 is formed with a pawl portion 5a that is engageable with a step portion 3a of the latch plate 3 and an arm portion 5b that extends upward. That is, when the pawl portion 5a is engaged with the step portion 3a of the latch plate 3, pivoting of the latch plate 3 about the pivot shaft 4 is suppressed.

As is seen from FIGS. 1 and 8, the retaining plate 7 is pivotally held by the pivot shaft 6 like the pawl plate 5. As seen from FIG. 1, still another biasing spring S3 is set in the housing 1 to bias the retaining plate 7 to pivot about the pivot shaft 6 in a counterclockwise direction in FIG. 1. The retaining plate 7 is formed at a leading part thereof with a cam portion 7a that is engageable with the striker 2, more specifically, the horizontally extending part 2a of the striker 2, and at a generally middle part thereof with a pair of (or left and right) bent portions 7b and 7c that are selectively engageable with the arm portion 5b of the pawl plate 5 and at the other end part thereof with a connecting portion 7d that is to be connected to a control lever (not shown) through a rod (not shown). The control lever may be mounted for example on a front lower surface of the seat portion 102A of the seat 100 (see FIG. 9).

Referring back to FIGS. 1 and 8, the other retaining plate 8 is pivotally held by a pivot shaft 9 secured to the bottom wall of the recessed base plate 1a of the housing 1 (see FIG. 8). As is seen from FIG. 1, the retaining plate 8 is formed at a leading part thereof with a cam portion 8a that is engageable with the striker 2, more specifically, the horizontally extending part 2a of the striker 2.

Figure 4:
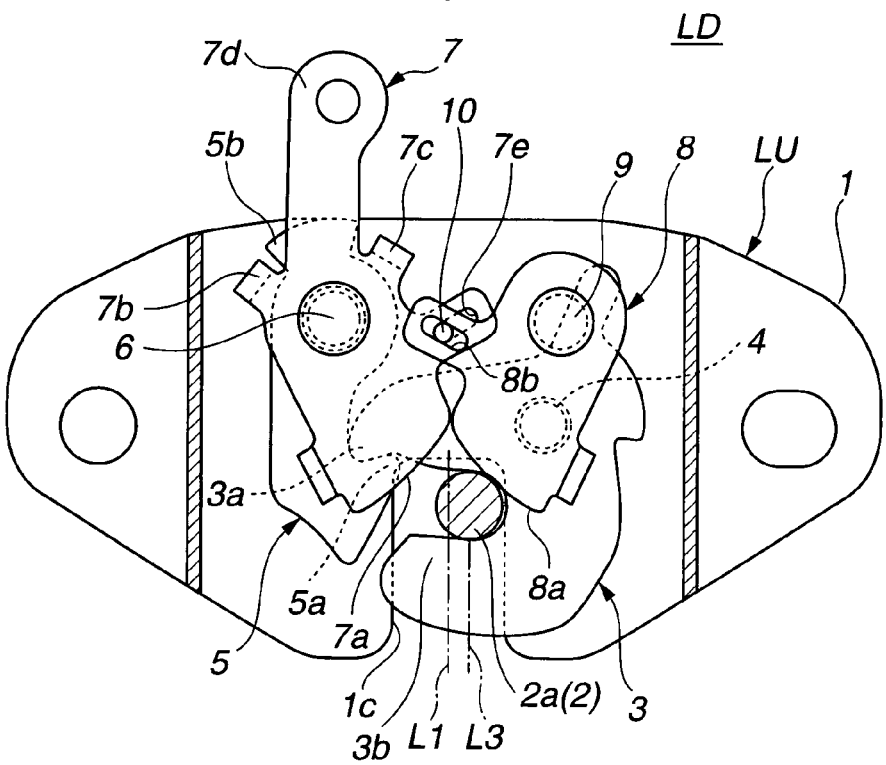
FIG. 4 is a view similar to FIG. 3, but showing a condition wherein the striker takes another offset position displaced rightward relative to the lock unit.
Figure 5:
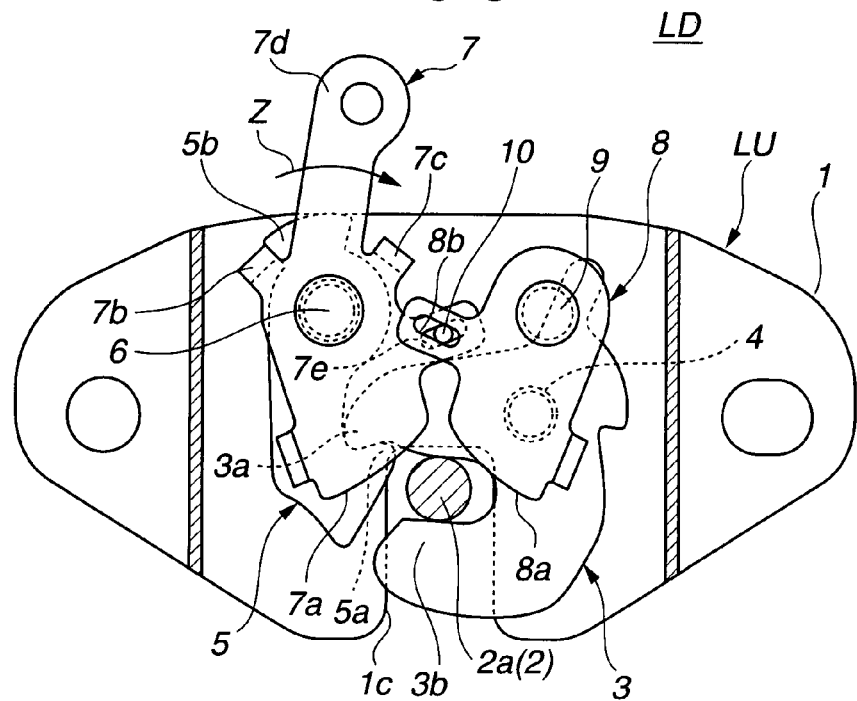
FIG. 5 is a view similar to FIG. 1, but showing a condition wherein a so-called lock canceling operation is about to start.

As is best seen from FIG. 4, the two retaining plates 7 and 8 are formed at projected portions thereof with respective slots 7e and 8b through which a pin 10 passes. As is seen from FIG. 8, both ends of the pin 10 are enlarged to suppress disconnection of the pin 10 from the slots 7e and 8b. A slider washer 10a made of plastic or steel through which the pin 10 passes is slidably put between the projected portions of the retaining plates 7 and 8 to smooth the sliding movement of the pin 10 in the slots 7e and 8b.

In the following, operation of the lock device "LD" of the invention will be described with reference to the drawings.

For ease of understanding, the description will be commenced with respect to a condition wherein the seat 100 is in its upper not in-use position for providing the vehicle floor with a larger free space. As is mentioned hereinabove and as will be imaged from FIG. 9, under this not in-use condition, the entire construction of the seat 100 is raised up on the hinge mechanism 101 with the back rest 102B (see FIG. 9) intimately received on the seat portion 102A and with the U-shaped leg pipe 106 flatly retracted on the bottom surface of the seat portion 102A. That is, the bottom surface of the seat portion 102A extends vertically in the vehicle cabin.

Under this rest condition of the seat 100, the lock unit "LU" of the lock device "LD" of the invention takes such a condition as shown in FIG. 1 except positioning of the striker 2. That is, as is understood from FIG. 1, the latch plate 3 takes a stand-by position wherein a striker catch opening (no numeral) provided by the latch plate 3 faces the striker receiving slot 1c of the housing 1. Furthermore, the step portion 3a of the latch plate 3 is kept disengaged from the pawl portion 5a of the pawl plate 5. Furthermore, the bent portion 7c of the restraining plate 7 abuts against the right edge of the arm portion 5b of the pawl plate 5.

When, after pivoting the U-shaped leg pipe 106 to its in-use stand position, the entire construction of the seat 100 is pulled inwardly with a certain force, the seat 100 is pivoted down to its normal in-use position as is seen from FIG. 9.

During this, as is seen from FIG. 1, the striker 2 (more specifically, the horizontally extending part 2a of the same) is rushed into the striker receiving slot 1c of the lock unit "LU" pushing the latch plate 3 in a clockwise direction against the biasing force of the spring S1.

Figure 2:
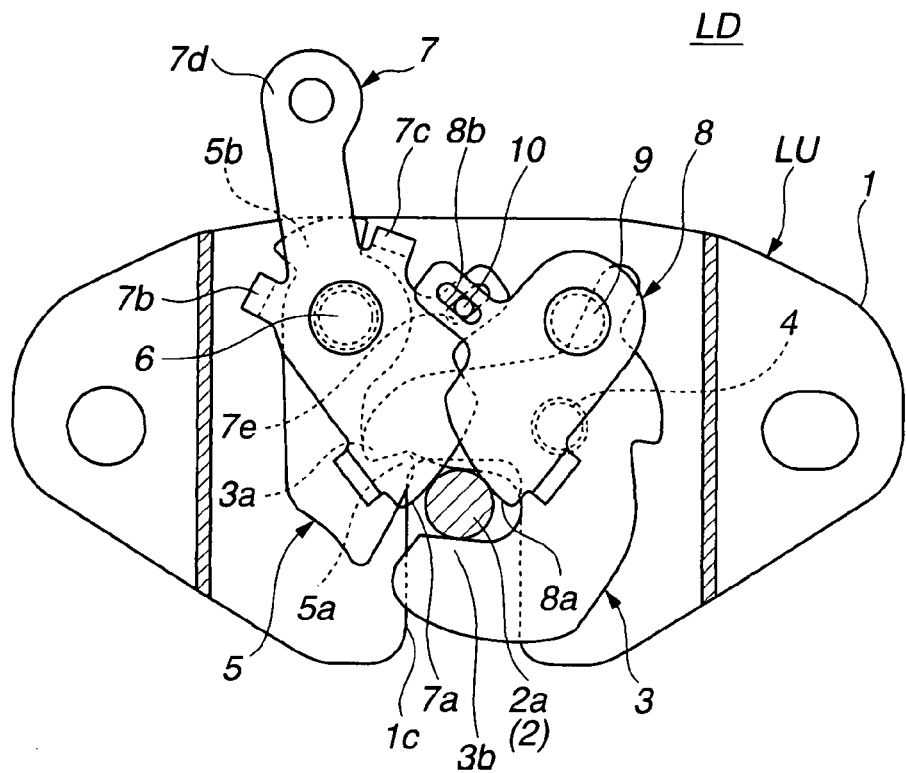
FIG. 2 is a view similar to FIG. 1, but showing a condition wherein the lock unit properly receives therein the striker.

Once the seat 100 is pivoted down to the normal in-use position, the striker 2 brings the latch plate 3 to a given position wherein, as shown in FIG. 2, the step portion 3a of the latch plate 3 is intimately engaged with the pawl portion 5a of the pawl plate 5. Upon this, the latch plate 3 is suppressed from pivoting in the counterclockwise direction in FIG. 2, and thus, the striker 2 is locked by the lock unit "LU". Of course, under this condition, the seat 100 can not be raised.

It is now to be noted that under this locked condition, the striker 2 is tightly held by three portions in a so-called three point holding manner, which are the cam portion 7a of the restraining plate 7, the cam portion 8a of the other restraining plate 8 and a jaw portion 3b of the latch plate 3. It is to be noted that under this condition, the cam portion 7a is biased rightward by the force of the biasing spring S3, and the cam portion 8a is biased leftward by a force that is transmitted thereto from the biasing spring S3 through a transmission mechanism that includes the slot 7e of the restraining plate 7, the pin 10 and the slot 8b of the other restraining plate 8, and thus the three point holding applied to the striker 2 is much assured. Accordingly, under the locked condition of the lock device "LD", the seat 100 can take the normal in-use position without play.

Figure 3:
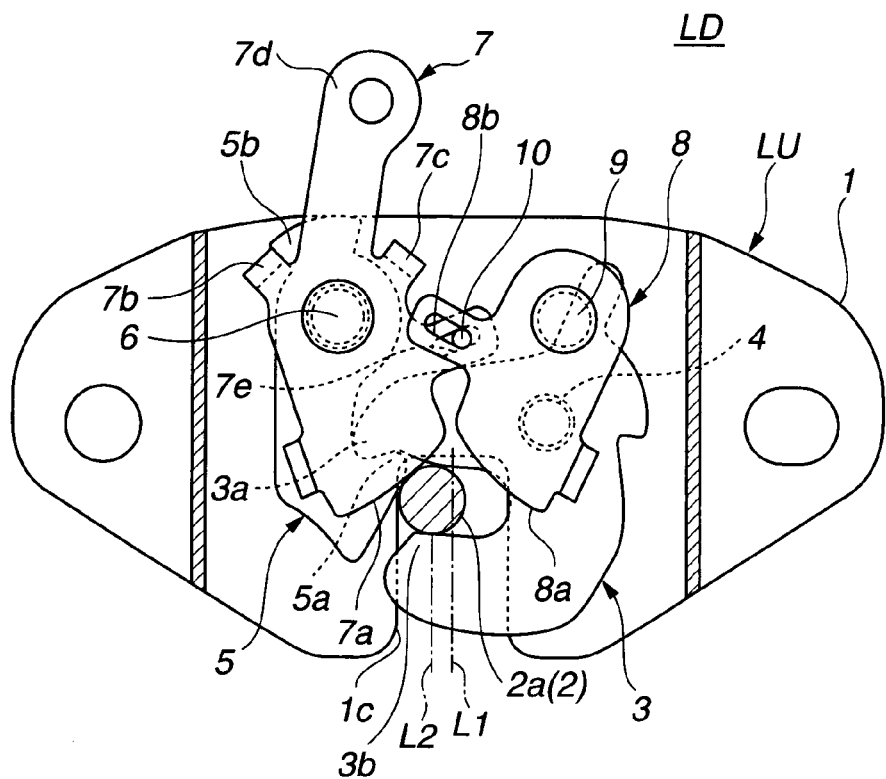
FIG. 3 is a view similar to FIG. 1, but showing a condition wherein the striker takes an offset position displaced leftward relative to the lock unit.

If, as is shown in FIG. 3, the striker 2 takes an offset position displaced toward the restraining plate 7 due to for example inexact normal in-use position of the seat 100, the cam portion 7a of the retaining plate 7 and the jaw portion 3b of the latch plate 3 work together to tightly hold the striker 2 for suppressing or at least minimizing the play of the seat 100. That is, in this case, the striker 2 takes a traveling path "L2" that is offset from a normal traveling path "L1".

If, as is shown in FIG. 4, the striker 2 takes another offset position displaced toward the other restraining plate 8, the cam portion 8a of the restraining plate 8 and the jaw portion 3b of the latch plate 3 work together to tightly hold the striker 2. In this case, the striker 2 takes a traveling path "L3" that is offset from the normal traveling path "L1".

It is to be noted that once the seat 100 is pivoted down to the normal in-use position and locked by the lock device "LD" in the above-mentioned manner, the back rest 102B that has assumed its rest or flat position is pivoted up from the seat portion 102A to its raised position as is seen from FIG. 9.

When now it is needed to retract or fold up the seat 100 for increasing the free space of the vehicle floor, the control lever (not shown) installed beneath the seat portion 102A is handled by an operator in a given manner. Upon this, the restraining plate 7 is pivoted about the pivot shaft 6 in a clockwise direction "Z" in FIG. 5, and thus, the cam portion 7a of the retaining plate 7 is released from the striker 2. During this, due to the function of the transmission mechanism including the slot 7e of the restraining plate 7, the pin 10 and the slot 8b of the other restraining plate 8, the restraining plate 8 is forced to pivot about the pivot shaft 9 in a counterclockwise direction in FIG. 5 releasing the cam portion 8a thereof from the striker 4.

Figure 6:
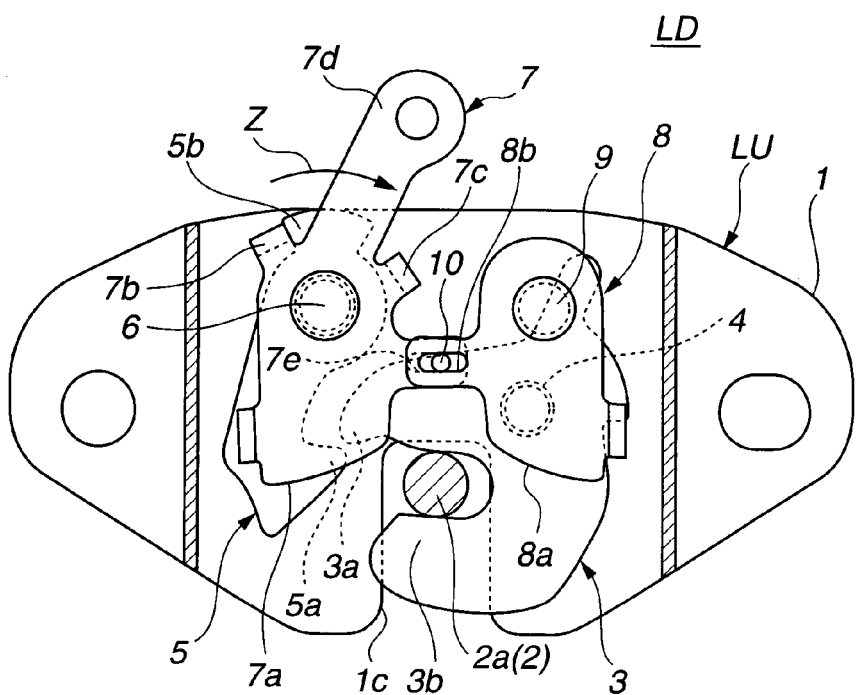
FIG. 6 is a view similar to FIG. 5, but showing a condition wherein due to the lock canceling operation a pawl plate is released from a latch plate.

As is seen from FIG. 6, when the restraining plate 7 is pivoted to the most-clockwise position, the left bent portion 7b of the plate 7 pushes a left edge of the arm portion 5b of the pawl plate 5 thereby pivoting the pawl plate 5 about the pivot shaft 6 in a clockwise direction and thus disengaging the pawl portion 5a of the pawl plate 5 from the step portion 3a of the latch plate 3. That is, the locked and engaged condition of the latch plate 3 becomes cancelled.

Figure 7:
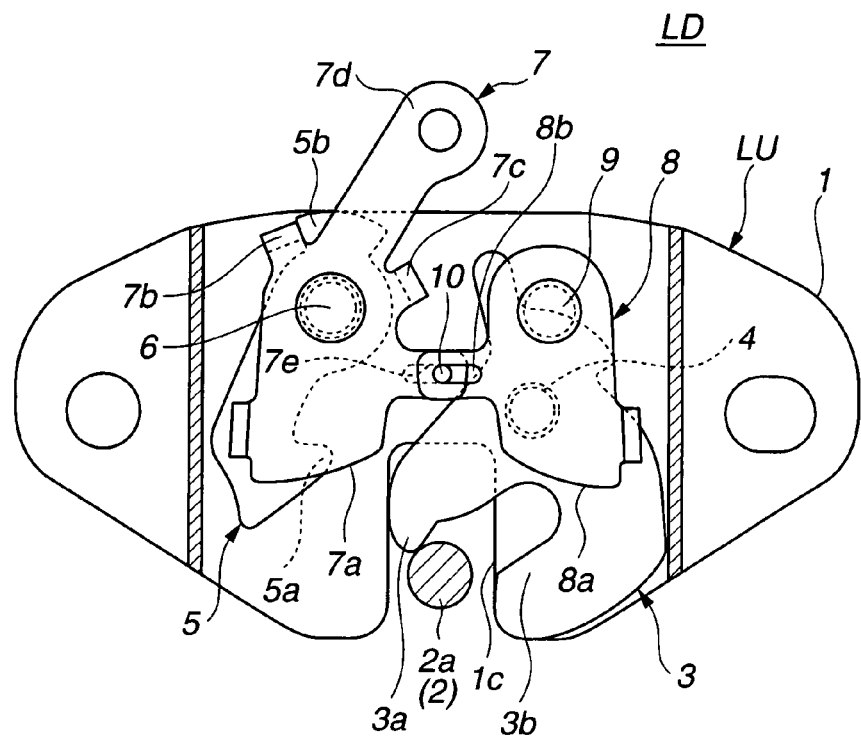
FIG. 7 is a view similar to FIG. 6, but showing a condition wherein the latch plate takes a position to release the striker.

Upon this, as is seen from FIG. 7, due to the force of the biasing spring S1 (see FIG. 1), the latch plate 3 is forced to pivot in a counterclockwise direction to release the striker 2. Upon sensing the release of the latch plate 3 from the striker 2, the operator releases his or her hand from the control lever. Upon this, the retaining plate 7 is returned back to the position of FIG. 1 due to the force of the biasing spring S3.

Thereafter, by the operator, the back rest 102B (see FIG. 9) is pivoted backward to the rest or flat position, and then, the entire construction of the seat 100 is pivoted upward about the hinge mechanism 101 to the upper not in-use position. Then, the U-shaped leg pipe 106 is flatly retracted on the bottom surface of the seat portion 102A.

In the following, advantages of the present invention will be itemized.

As is described hereinabove, even when the striker 2 and the lock unit "LU" show a poor relative positioning therebetween as is shown in FIGS. 3 and 4, the locked and engaged condition between the lock unit "LU" and the striker 2 is assuredly and tightly achieved because at least one of the cam portion 7a of the retaining plate 7 and the cam portion 8a of the other retaining plate 8 is tightly pressed against the striker 2 to suppress or at least minimize a play of the seat 100.

For the same reasons just mentioned hereinabove, the lock device "LD" of the present invention does not need a higher precision in positioning and thus the lock device "LD" can be easily assembled with a lower cost.

Because of employment of the two restraining plates 7 and 8 that are operatively linked, the function of assuredly and tightly holding the striker 2 and that of releasing the striker 2 are carried out with smaller strokes of the plates 7 and 8, which brings about a compact construction of the lock device "LD" of the invention.

If desired, the following modifications may be employed.

In place of the above-mentioned movement transmission mechanism including the slot 7e of the restraining plate 7, the pin 10 and the slot 8b of the other restraining plate 8, a mechanism is usable that comprises a slot formed in one of the retaining plates 7 and 8 and a pin formed on the other of the retaining plates 7 and 8 and slidably engaged with the slot, and another mechanism is usable that comprises mutually engaged gear members provided between the two retaining plates 7 and 8.

The entire contents of Japanese Patent Application 2006-236299 filed Aug. 31, 2006 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A lock device comprising:
a striker;
a lock unit including a housing having a striker receiving slot, a latch plate pivotally installed in the housing to latch the striker when the striker comes into the striker receiving slot, a pawl plate pivotally installed in the housing to lock the latch plate when pivoting in a given direction, and a biasing device configured to bias the latch plate in a direction to release the striker and biasing the pawl plate in a direction to induce the locking of the latch plate;
a pair of restraining plates pivotally installed in the housing, the restraining plates having respective cam portions that are arranged to put therebetween the striker when the restraining plates are pivoted in respective given directions;
a biasing member for biasing one of the restraining plates to pivot in the given direction thereof; and
a transmission mechanism arranged between the restraining plates to induce a synchronized pivoting of the two restraining plates, so that when one of the restraining plates is pivoted in the given direction thereof, the other of the restraining plates is pivoted in the given direction thereof,
wherein the lock device is configured such that when the latch plate is in a position to release the striker, the cam portions of the restraining plates are arranged to overlap each other when viewed in a direction parallel to pivoting axes of the restraining plates.

2. A lock device as claimed in claim 1, in which the striker receiving slot of the housing is so sized as to induce a condition wherein when the striker is latched by the latch plate and the restraining plates are pivoted in the respective given directions with aid of a force of the biasing member, only one of the cam portions of the restraining plates is pressed against the striker.

3. A lock device as claimed in claim 1, in which the transmission mechanism comprises:
a slot formed in a projected portion of one of the restraining plates;
another slot formed in a projected portion of another of the restraining plates; and
a pin that slidably passes through both the slots.

4. A lock device as claimed in claim 1, in which the pawl plate and one of the restraining plates have a common pivot shaft secured to the housing.

5. A lock device as claimed in claim 4, in which the pawl plate is formed with an arm portion having longitudinal ends, and in which said one of the restraining plates is formed with a pair of bent portions between which the arm portion of the pawl plate is spacedly received.

6. A lock device as claimed in claim 3, in which the transmission mechanism further comprises a slider washer through which the pin passes, the slider washer being slidably put between the projected portions of the restraining plates.

7. A lock device as claimed in claim 1, in which the biasing device of the lock unit comprises:
a first biasing member that biases the latch plate in a direction to release the striker; and
a second biasing member that biases the pawl plate in a direction to induce the locking of the latch plate.

8. A lock device as claimed in claim 1, wherein the restraining plates are configured to pivot in opposite directions to one another.

9. A lock device as claimed in claim 1, wherein the restraining plates pivot about pivot shafts, with each restraining plate having a different pivot shaft.

* * * * *